(12) United States Patent
Silvera et al.

(10) Patent No.: US 7,487,501 B2
(45) Date of Patent: Feb. 3, 2009

(54) DISTRIBUTED COUNTER AND CENTRALIZED SENSOR IN BARRIER WAIT SYNCHRONIZATION

(75) Inventors: Raul Esteban Silvera, Ontario (CA); Kevin Alexander Stoodley, Ontario (CA); Guansong Zhang, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/929,165

(22) Filed: Aug. 30, 2004

(65) Prior Publication Data

US 2006/0048147 A1    Mar. 2, 2006

(51) Int. Cl.
G06F 9/46 (2006.01)
G06F 1/00 (2006.01)

(52) U.S. Cl. ........................ 718/100; 713/500
(58) Field of Classification Search ............ 718/1, 718/100, 102, 104, 106; 713/375, 400, 500
See application file for complete search history.

(56) References Cited

U.S. PATENT DOCUMENTS

2002/0062463 A1   5/2002 Hines
2002/0194393 A1   12/2002 Hrischuk et al.
2003/0121027 A1   6/2003 Hines

OTHER PUBLICATIONS

Markatos et al. "The effects of multiprogramming on barrier synchronization", 1991, IEEE, pp. 662-669.*
Demara et al., "BArrier synchronization techniques for distributed process creation", 1994, IEEE, pp. 597-603.*
Zhang, Guansong; Martinez, Francisco; Tal, Arie and Blainey, Bob, *Busy-wait barrier synchronization using distributed counters with local sensor*, at 1-15 (IBM Corporation 2003).

* cited by examiner

*Primary Examiner*—Meng-Ai An
*Assistant Examiner*—Caroline Arcos
(74) *Attorney, Agent, or Firm*—Leonora Hoicka, Esq.; Steven M. Greenberg, Esq.

(57) ABSTRACT

A method, system and apparatus for barrier synchronization using distributed counters and a centralized sensor. The system can include multiple distributed counters coupled to corresponding application processes in a computing application. The barrier synchronization system further can include a centralized sensor coupled for observation by the application processes. Preferably, the application processes can be separate threads of execution in the computing application. The barrier synchronization centralized sensor yet further can be managed by a designated master one of the application processes. Moreover, preferably the system further can include a backup sensor coupled for observation by the application processes and managed by the designated master one of the application processes.

4 Claims, 3 Drawing Sheets

DISTRIBUTED COUNTER AND CENTRALIZED SENSOR IN BARRIER WAIT SYNCHRONIZATION

BACKGROUND OF THE INVENTION

1. Statement of the Technical Field

The present invention relates to the field of parallel computing and more particularly to the use of a barrier wait synchronization in a parallel computing application.

2. Description of the Related Art

In the field of parallel computing, a barrier synchronization point refers to a state where multiple independently acting processes arrive at a common position at different times. Each of the processes can wait for each other process until all of the participating processes arrive at the common position. Once all of the processes have arrived at the common position, the processes can be released to continue separate execution without regard to the state of each other of the processes.

Barrier synchronization is a programming technique typically used to separate different "phases" of an application program. Given the ability of barrier synchronization techniques to coordinate the independent execution of different processes, barrier synchronization remains one of the most important mechanisms known in the art of parallel programming. In fact, not only does the literature of the art support such a notion, but also the use of barrier synchronization techniques have been reflected in the well-known shared memory parallel programming standard, OpenMP and its different language extensions.

Barrier synchronization has been implemented according to several well-known methods. In a first typical barrier synchronization method, referred to as "fetch-and-add", a fetch-and-add hardware instruction can be employed to decrement an established counter. Following the decrement operation, the waiting processes can be scheduled. In a second typical barrier synchronization method, different memory words can be used for different synchronization states without using special hardware instructions.

In yet a third methodology, the fetch-and-add concept can be replaced with a distributed counter, with elements of the local positioned locally to each executing process. A series of local sensors, each which is positioned locally to each executing process, each can be monitor the counters of all other processes. Each locally positioned sensor can indicate to the corresponding process when it is appropriate to leave the barrier and to continue processing.

Notably, by using distributed counters rather than a machine-specific fetch-and-add operation, the overhead of managing conflicts for accessing a single shared variable can be avoided. Notwithstanding, coordinating the operation of multiple, local sensors has proven to be resource expensive in terms of required interconnected network traffic.

SUMMARY OF THE INVENTION

The present invention addresses the deficiencies of the art in respect to barrier synchronization and provides a novel and non-obvious method, system and apparatus for barrier synchronization using a distributed counter and a centralized sensor. In particular, the barrier synchronization system of the present invention can include multiple distributed counter elements coupled to corresponding application processes in a computing application. The barrier synchronization system further can include a centralized sensor coupled for observation by the application processes. Preferably, the application processes can be separate threads of execution in the computing application.

The barrier synchronization centralized sensor yet further can be managed by a designated master one of the application processes. Moreover, the system even yet further can include a backup sensor coupled for observation by the application processes and managed by the designated master one of the application processes. In this regard, each of the application processes in the system can select a centralized sensor for observation when arriving at a barrier. For instance, each of the application processes can maintain a barrier counter indicating a number of barriers encountered. Based upon the counter value, a corresponding application process can select a suitable centralized sensor.

Notably, each of the application processes can include logic for arriving at a barrier, decrementing a corresponding one of the distributed counter elements, checking the centralized sensor to determine whether to leave the barrier, and, leaving the barrier if indicated by the centralized sensor. The designated master one of the application processes also can include logic for checking the distributed counters to determine if all other application processes have arrived at the barrier, and, if all other application processes have arrived at the barrier, resetting the distributed counters and resetting the centralized sensor to indicate to the application processes to leave the barrier.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for barrier synchronization utilizing a distributed counter and a centralized sensor. In accordance with the present invention, each of several general application processes can be coupled to a local counter. When each general application process completes a processing task so as to arrive at the barrier, the general application process can decrement the counter. Subsequently, the general application process can observe a centralized sensor to determine whether or not to leave the barrier. Until the sensor indicates otherwise, the general application process can spin, periodically checking the centralized sensor for a change of state.

Notably, a master application process similarly can complete a processing task so as to arrive at the barrier. Responsive to arriving at the barrier, however, the master application process can inspect all of the counters of the general application processes. If all of the counters have not reached a trigger value—typically zero—the master application process can spin, periodically checking the counters. Once all of the counters have reached a trigger value, the master application process can reset each of the counters of the general application processes. The master application process further can reset the centralized sensor so as to signal the general application process to leave the barrier. Finally, the master application process can set the sensor back to a non-trigger position and the master application process can leave the barrier.

Figure 1:
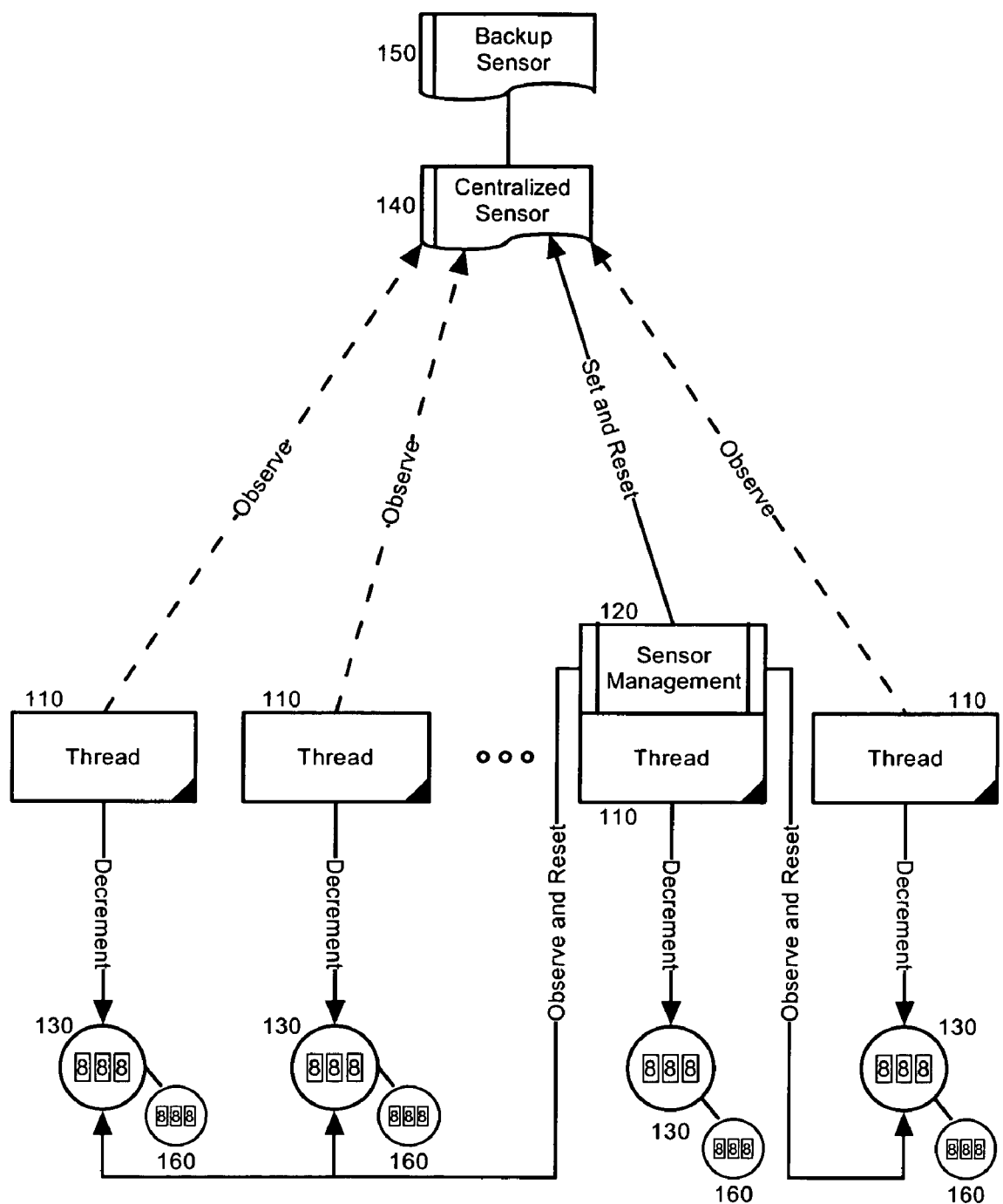
FIG. 1 is a schematic illustration of a distributed application configured for barrier synchronization utilizing distributed counters and a centralized sensor in accordance with the inventive arrangements.

In further illustration, FIG. 1 is a schematic illustration of a distributed application configured for barrier synchronization utilizing distributed counters and a centralized sensor in accordance with the inventive arrangements; The system of the present invention can include a multiplicity of independently executing application processes 110. The independently executing application processes 110 can act in concert so as to achieve a common application goal. In this regard, the independently executing application processes 110 can be separate threads of execution in an applications program.

Each of the independently executing application processes 110 can be tooled for barrier-wait synchronization. To that end, each of the independently executing application processes 110 can be coupled to a distributed counter element 130. Each of the independently executing application processes 110 further can be coupled to a centralized sensor 140. As such, when the independently executing application processes 110 arrive at the barrier, the independently executing application processes 110 can decrement the coupled distributed counter element 130 and can refer to the centralized sensor 140 to determine whether or not to leave the barrier.

Importantly, one of the independently executing application processes 110 can be designated as a master processes and can be tooled with sensor management logic 120. The sensor management tool logic 120 can be programmed to monitor the state of the distributed counter elements 130 for the other independently executing application processes 110. When the sensor management tool logic 120 determines that all of the distributed counter elements 130 have been decremented, the sensor management tool logic 120 can reset the centralized sensor 140 so that the independently executing application processes 110 when referring to the centralized sensor 140 will know to leave the barrier.

Notably, the centralized sensor arrangement shown in FIG. 1 can capitalize on a hardware cache coherence mechanism to broadcast the sensor data to each of the independently executing application processes 110. Two cache lines can be utilized in a preferred aspect of the invention. The first cache line can be used as the centralized sensor 140. Advantageously, the second cache line can be used as a backup sensor 150. In this regard, as the centralized sensor 140 can be shared, the centralized sensor 140 cannot be reset by the independently executing application processes 110 because a "slower" performing one of the independently executing application processes 110 may still be in the process of reading the centralized sensor 140.

To address the potential racing condition, the backup sensor 150 can be used. Specifically, the backup sensor 150 can be deployed as an alternate to the centralized sensor 140 which is to be utilized as the centralized sensor alternately based upon the number of barriers encountered by the application processes 110. Specifically, by referring to barrier counters 160, each of the application processes 110 can determine which of the sensors 140, 150 to use. For instance, in this case of a single bit counter for the barrier counters 160, a zero can indicate the use of the centralized sensor 140 and a one can indicate the use of the backup sensor 150.

Based upon this exemplary arrangement, the increase of the barrier counter 160 can cause the new selection of a different one of the sensors 140, 150. As such, before a barrier is encountered, the backup sensor 150 can be reset so, at the next barrier, the centralized sensor 140 and the backup sensor 150 can switch positions. As a result, the centralized sensor 140 can be used to complete the operation and the backup sensor 150 can be reset again for the next synchronization.

Figure 2:
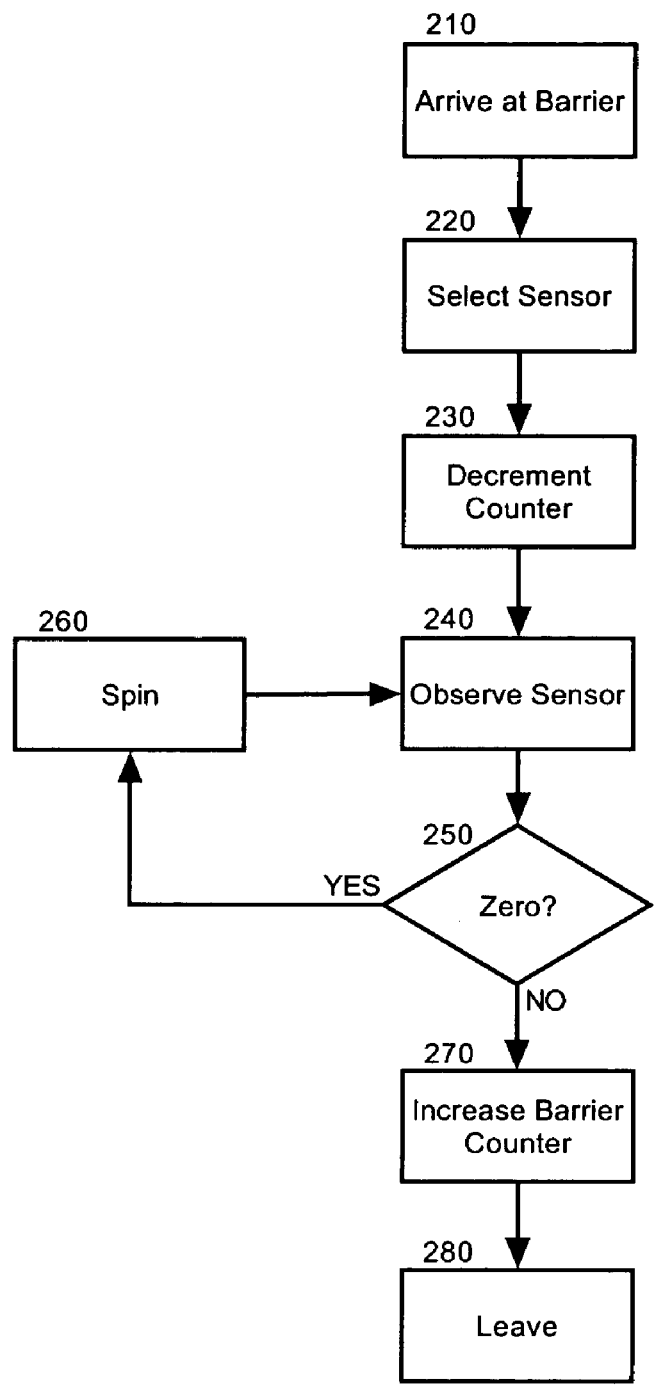
FIG. 2 is a flow chart illustrating a process for barrier synchronization utilizing distributed counters and a centralized sensor performed in a general application process in the system of FIG. 1; and, FIG. 3 is a flow chart illustrating a process for barrier synchronization utilizing distributed counters and a centralized sensor performed in a master application process of execution in the system of FIG. 1.

The independently executing application processes 110 can be tooled for barrier synchronization differently depending upon whether one of the independently executing application processes 110 have been designated as a master process. FIG. 2 is a flow chart illustrating a process for barrier synchronization utilizing distributed counters and a centralized sensor performed in a general process in the system of FIG. 1. By comparison, FIG. 3 is a flow chart illustrating a process for barrier synchronization utilizing distributed counters and a centralized sensor performed in a master process in the system of FIG. 1.

Referring first to FIG. 2, in block 210, the general application process can arrive at the barrier. In block 220, the general application process can select from among the centralized and backup sensor as a reference based upon the number of barriers previously encountered. Additionally, in block 230 the general application process can decrement the distributed counter element. In block 240, the general application process can observe the selected sensor to determine whether all other application processes have been synchronized and whether it is permitted to leave the barrier.

If in decision block 250 the selected sensor indicates that it is OK to proceed, for instance if the sensor has been reset to zero, then in block 270 the general application process can increase the barrier count to maintain a local accounting of the number of barriers already encountered. Additionally, in block 280 the general application process can leave the barrier. Otherwise, if in decision block 250 the selected sensor indicates that it is not OK to proceed, in block 260 the application process can spin for a time and the process can repeat beginning in block 240.

Figure 3:
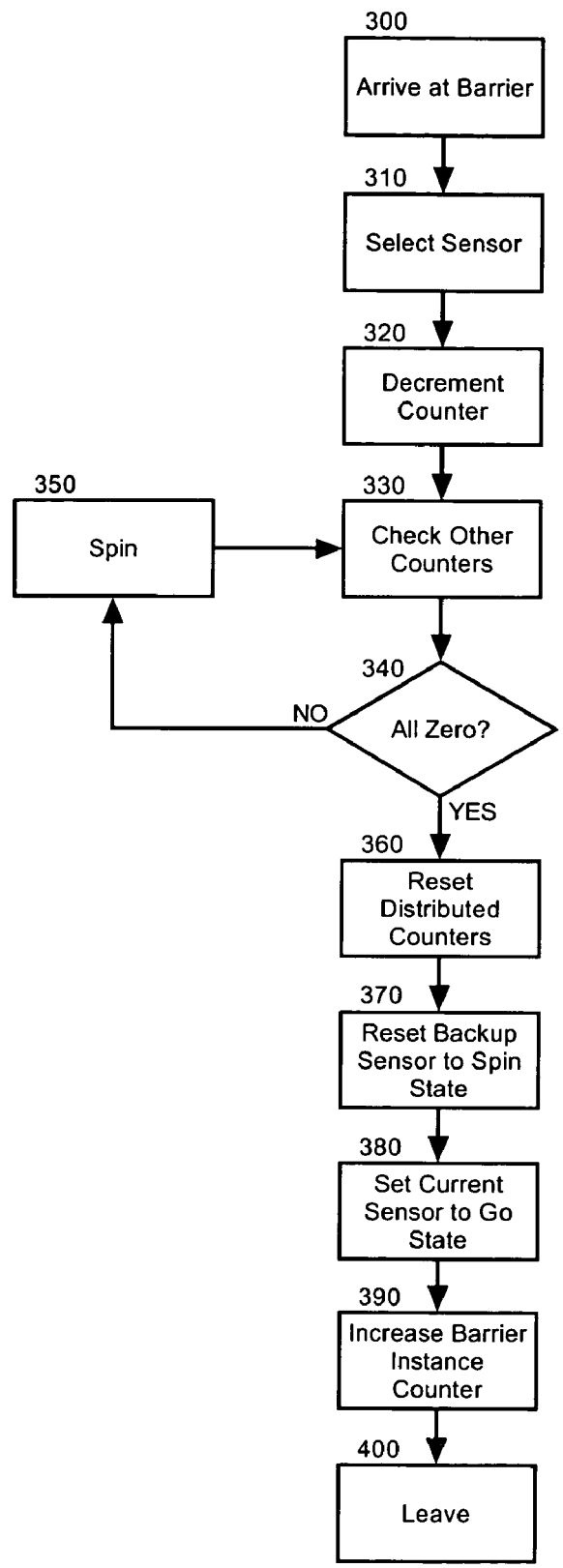

Referring now to FIG. 3, in block 300, the master application process can arrive at the barrier. In block 310 a sensor can be selected as had been the case in FIG. 2. Additionally, in block 320 the master application process can decrement the distributed counter element local to the master application process. In block 330, the master application process can check the counters local to the general application processes to ensure that all of the general application processes have arrived at the barrier. If, in decision block 340, it is determined that not all of the general application processes have arrived at the barrier, the master application process can spin in block 350 for a time and once again, the master application process can check the counters local to the general application processes in block 330.

Once the master application process determines that all of the general application processes have arrived at the barrier in decision block 340, in block 360 each of the distributed counter elements for the general application processes can be reset and the backup sensor can be reset to a "spin" state in block 370. Additionally, in block 380 the current sensor can be set to a "go" state in order to signal to the general application processes that it is now OK to leave the barrier. Finally, in block 390 the barrier instance counter can be increased and in block 400 the master application process can leave the barrier as well.

Importantly, in the process collectively illustrated in FIGS. 2 and 3, separate logic is illustrated depending upon whether an application process is a general application process, or a master application process. In a preferred aspect of the invention, the sensor management logic can be unified in a single code block and applied to all application processes utilizing conditional logic to determine whether to execute logic suitable for a master application process or a general application process.

Finally, as it will be further apparent from the process collectively illustrated in FIGS. 2 and 3, in the barrier synchronization approach of the present invention, the overhead of a barrier synchronization operation using a distributed counter can be decreased using an array of cache lines for the centralized and local sensors. Using a distributed counter, it is not necessary to use a machine specific fetch-and-add operation, thus reducing the overhead yet further when can occur when a conflict arises in accessing the same shared variable. Finally, by using centralized sensors, the cost needed for interconnect network traffic can be lowered. In this regard, the signal broadcasting can be performed through a cache coherence algorithm implemented in the hardware system.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A barrier synchronization method comprising the steps of:
   in a general application process:
      arriving at a barrier;
      decrementing a local portion of a distributed counter element;
      checking a centralized sensor to determine whether to leave said barrier;
      leaving said barrier if indicated by said centralized sensor; and,
   in a master application process: arriving at said barrier;
      checking all portions of said distributed counter element to determine if all other general application processes have arrived at said barrier; and,
      if all other general application process have arrived at said barrier, resetting said distributed counter element and resetting said centralized sensor to indicate to said general application processes to leave said barrier.

2. The method of claim 1, further comprising the step of selecting said centralized sensor from among a plurality of centralized sensors based upon a number of barriers encountered.

3. The method of claim 2, further comprising the steps of:
   referring to a local barrier counter to determine said number of barriers encountered; and,
   incrementing said local barrier counter when leaving said barrier.

4. The method of claim 1, wherein said general application process and said master application process are separate threads of execution in said computing application.

* * * * *